(12) United States Patent
Niioka et al.

(10) Patent No.: US 11,634,139 B2
(45) Date of Patent: Apr. 25, 2023

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Takuya Niioka, Wako (JP); Takayasu Kumano, Wako (JP); Kazuma Ohara, Wako (JP); Suguru Yanagihara, Wako (JP); Yuki Motegi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 204 days.

(21) Appl. No.: 16/563,967

(22) Filed: Sep. 9, 2019

(65) Prior Publication Data
US 2020/0156645 A1 May 21, 2020

(30) Foreign Application Priority Data

Nov. 19, 2018 (JP) .............................. JP2018-216433

(51) Int. Cl.
| | | |
|---|---|---|
| *B60W 30/18* | (2012.01) | |
| *B60W 10/04* | (2006.01) | |
| *B60W 10/20* | (2006.01) | |

(52) U.S. Cl.
CPC ...... *B60W 30/18163* (2013.01); *B60W 10/04* (2013.01); *B60W 10/20* (2013.01); *B60W 30/18009* (2013.01); *B60W 2552/15* (2020.02); *B60W 2554/00* (2020.02); *B60W 2710/20* (2013.01); *B60W 2720/106* (2013.01)

(58) Field of Classification Search
USPC .......................................................... 701/41
See application file for complete search history.

(56) References Cited

U.S. PATENT DOCUMENTS

| | | | | |
|---|---|---|---|---|
| 2012/0095651 | A1* | 4/2012 | Anderson | ............. G05D 1/028 701/50 |
| 2012/0158248 | A1* | 6/2012 | Suk | .......................... B60R 21/01 701/45 |

(Continued)

FOREIGN PATENT DOCUMENTS

| | | |
|---|---|---|
| JP | 2008-032557 | 2/2008 |
| JP | 2016-017914 | 2/2016 |

(Continued)

OTHER PUBLICATIONS

Japanese Office Action for Japanese Patent Application No. 2018-216433 dated Oct. 6, 2020.

*Primary Examiner* — Mahmoud S Ismail
(74) *Attorney, Agent, or Firm* — Amin, Turocy & Watson, LLP

(57) ABSTRACT

A vehicle control device in an embodiment includes a recognition unit that recognizes a surrounding situation of a vehicle and a driving control unit that controls one or both of steering and acceleration or deceleration of the vehicle on the basis of the surrounding situation recognized by the recognition unit, and in a case where the vehicle merges into a second lane from a first lane in which the vehicle travels, and a section of the second lane before merging recognized by the recognition unit is downhill, the driving control unit makes a speed or acceleration of the vehicle higher than in a case where the section before merging is not downhill.

12 Claims, 11 Drawing Sheets

(56) References Cited

U.S. PATENT DOCUMENTS

2015/0306957 A1* 10/2015 Sujan .................. B60W 30/143
                                                      701/94
2018/0079420 A1*  3/2018 Aine .................... B60W 10/18

FOREIGN PATENT DOCUMENTS

| JP | 2016-018495 | 2/2016 | |
|----|-------------|--------|---|
| JP | 2009-137550 | 6/2016 | |
| JP | 2016-141220 | 8/2016 | |
| WO | WO-2017187884 A1 * | 11/2017 | ................ B60T 7/12 |

* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2018-216433, filed Nov. 19, 2018, the content of which is incorporated herein by reference.

BACKGROUND

Field of the Invention

The present invention relates to a vehicle control device, a vehicle control method, and a storage medium.

Description of Related Art

In recent years, there has been progress in research for recognition of a surrounding road situation and autonomous control of a vehicle on the basis of a recognition result. As a method of recognizing a surrounding road situation, a technique for capturing an image of a road surface through an imaging unit mounted in a vehicle, recognizing a change in the height of a road surface on the basis of the captured image, and determining the type of road on which a vehicle is present with the addition to a recognition result is known (see, for example, Japanese Unexamined Patent Application, First Publication No. 2008-32557).

SUMMARY

However, in a specific traveling situation such as merging, appropriate driving control depending on a road situation may not be able to be executed.

The present invention was contrived in view of such circumstances, and one object thereof is to provide a vehicle control device, a vehicle control method, and a storage medium which make it possible to execute more appropriate driving control on the basis of a road situation during merging.

A vehicle control device, a vehicle control method, and a storage medium according to this invention have the following configurations adopted therein.

(1) According to an aspect of this invention, there is provided a vehicle control device including: a recognition unit that recognizes a surrounding situation of a vehicle; and a driving control unit that controls one or both of steering and acceleration or deceleration of the vehicle on the basis of the surrounding situation recognized by the recognition unit, wherein, in a case where the vehicle merges into a second lane from a first lane in which the vehicle travels, and a section of the second lane before merging recognized by the recognition unit is downhill, the driving control unit makes a speed or acceleration of the vehicle during merging higher than in a case where the section before merging is not downhill.

(2) In the aspect of the above (1), in a case where the vehicle merges into the second lane from the first lane, and the section of the second lane before merging is downhill, the driving control unit makes a target speed or target acceleration of the vehicle during merging higher than in a case where the section before merging is not downhill.

(3) In the above (1), in a case where the vehicle merges into the second lane from the first lane, and the section of the second lane before merging is downhill, the driving control unit accelerates the vehicle before merging to make a speed during entrance into the second lane higher than in a case where the section before merging is not downhill.

(4) In the aspect of the above (1), in a case where the vehicle merges into the second lane from the first lane, and the section of the second lane before merging is downhill, the driving control unit makes an acceleration after entrance into the second lane higher than in a case where the section of the second lane before merging is not downhill.

(5) In the aspect of the above (1), a sensor unit that detects a road situation around the vehicle is further included, and the driving control unit adjusts the speed or acceleration of the vehicle during merging on the basis of a detection distance of the section of the second lane before merging detected by the sensor unit.

(6) In the aspect of the above (1), a sensor unit that detects a road situation around the vehicle is further included, and in a case where the vehicle merges into the second lane from the first lane, and the section of the second lane before merging is downhill, the driving control unit turns a detection direction of the sensor unit upward more than in a case where the section before merging is not downhill.

(7) In the aspect of the above (1), the driving control unit adjusts a magnitude of the speed or acceleration of the vehicle during merging on the basis of at least one of a gradient degree of the downhill section, a height of a top of the downhill section, or a distance of the downhill section.

(8) According to an aspect of this invention, there is provided a vehicle control method including causing a computer, comprising: recognizing a surrounding situation of a vehicle; and controlling one or both of steering and acceleration or deceleration of the vehicle on the basis of the recognized surrounding situation, wherein, in a case where the vehicle merges into a second lane from a first lane in which the vehicle travels, and a section of the second lane before merging is downhill, a speed or acceleration of the vehicle is made higher than in a case where the section before merging is not downhill.

(9) According to an aspect of this invention, there is provided a storage medium having a program stored therein, the program causing a computer to: recognize a surrounding situation of a vehicle; and control one or both of steering and acceleration or deceleration of the vehicle on the basis of the recognized surrounding situation, wherein, in a case where the vehicle merges into a second lane from a first lane in which the vehicle travels, and a section of the second lane before merging is downhill, a speed or acceleration of the vehicle is made higher than in a case where the section before merging is not downhill.

According to (1) to (9), it is possible to execute more appropriate driving control on the basis of a road situation during merging.

DESCRIPTION OF EMBODIMENTS

Hereinafter, an embodiment of a vehicle control device, a vehicle control method, and a storage medium of the present invention will be described with reference to the accompanying drawings. The vehicle control device of the embodiment is applied to an autonomous driving vehicle. The term "autonomous driving" refers to, for example, controlling one or both of the steering and acceleration or deceleration of a vehicle and executing driving control. The above-described driving control also includes, for example, control for assisting an occupant's driving operation such as an adaptive cruise control system (ACC) or a lane keeping assistance system (LKAS). In the following, a case where rules of left-hand traffic are applied will be described, but in a case where rules of right-hand traffic are applied, the right and left may be interchanged.

[Overall Configuration]

Figure 1:
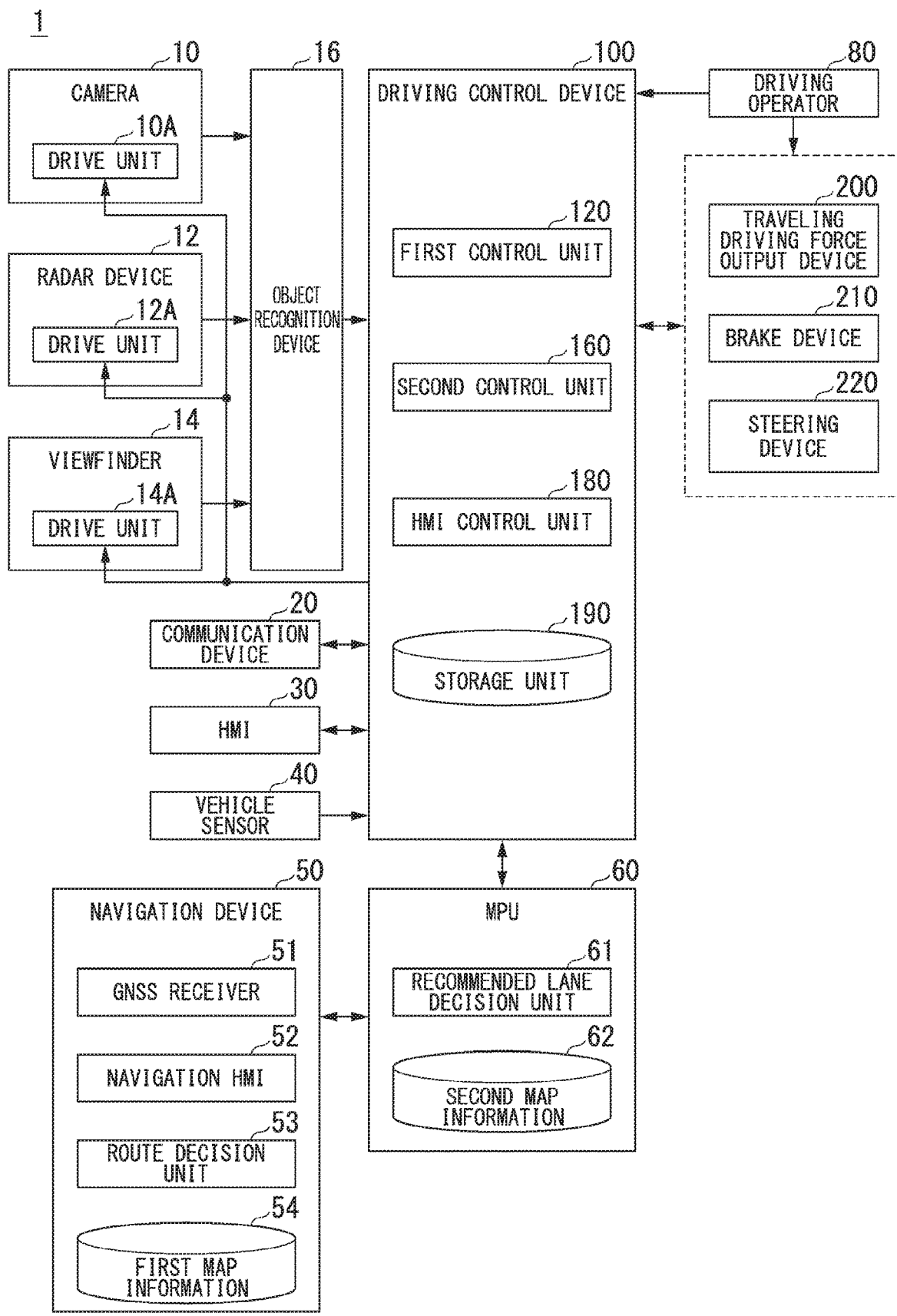
FIG. 1 is a configuration diagram of a vehicle system in which a vehicle control device according to an embodiment is used.

FIG. 1 is a configuration diagram of a vehicle system 1 in which a vehicle control device according to an embodiment is used. A vehicle having the vehicle system 1 mounted therein (hereinafter referred to as a host vehicle M) is, for example, a two-wheeled, three-wheeled, or four-wheeled vehicle or the like, and the driving source thereof is an internal-combustion engine such as a diesel engine or a gasoline engine, an electric motor, or a combination thereof. The electric motor operates using power generated by a generator connected to an internal-combustion engine or discharging power of a secondary battery or a fuel cell.

The vehicle system 1 includes, for example, a camera 10, a radar device 12, a viewfinder 14, an object recognition device 16, a communication device 20, a human machine interface (HMI) 30, a vehicle sensor 40, a navigation device 50, a map positioning unit (MPU) 60, a driving operator 80, a driving control device 100, a traveling drive force output device 200, a brake device 210, and a steering device 220. These devices or instruments are connected to each other through a multiplex communication line such as a controller area network (CAN) communication line, a serial communication line, a wireless communication network, or the like. The configuration shown in FIG. 1 is merely an example, and portions of the configuration may be omitted, or other configurations may be further added thereto. A combination of the camera 10, the radar device 12, and the viewfinder 14 is an example of a "sensor unit."

The camera 10 is a digital camera using a solid-state imaging element such as, for example, a charge coupled device (CCD) or a complementary metal oxide semiconductor (CMOS). The camera 10 is installed at any point on the host vehicle M. For example, in a case where a forward image of the host vehicle M is captured, the camera 10 is installed on the upper portion of the front windshield, the rear surface of the rear-view mirror, or the like. In a case where a rearward image of the host vehicle M is captured, the camera 10 is installed on the upper portion of the rear windshield or the like. In a case where a rightward or leftward image of the host vehicle M is captured, the camera 10 is installed on the right side, left side or the like of the car body or the side mirror. The camera 10 may be provided with a drive unit 10A that can change an image capture direction. The drive unit 10A moves the image capture direction to one or both of the top and bottom or the light and left within a predetermined range with respect to a reference direction. The camera 10, for example, repeatedly captures an image of the vicinity of the host vehicle M periodically. The camera 10 may be a stereo camera.

The radar device 12 radiates radio waves such as millimeter waves to the vicinity of the host vehicle M, and detects radio waves (reflected waves) reflected from an object included in a radiation range to detect at least the position (distance to and orientation of) of the object. The radar device 12 is installed at any point on the host vehicle M. The radar device 12 is installed at, for example, each position of the front, the rear, the right, and the left on the basis of each detection direction so that the positions of all objects in the vicinity of the host vehicle M can be ascertained. The radar device 12 may be provided with a drive unit 12A that can change the radiation direction of radio waves. The drive unit 12A moves the radiation direction of radio waves to one or both of the top and bottom or the light and left within a predetermined range with respect to a reference direction. The radar device 12 may detect the position and speed of an object with a frequency modulated continuous wave (FMCW) system.

The viewfinder 14 is a light detection and ranging (LIDAR) viewfinder. The viewfinder 14 irradiates the vicinity of the host vehicle M with light, and measures scattered light. The viewfinder 14 detects a distance to an object on the basis of a time from light emission to light reception. The irradiation light is, for example, pulsed laser light. The viewfinder 14 is installed at any point on the host vehicle M. For example, in a case where light is radiated to the front of the host vehicle M, the viewfinder 14 is installed on the front grill of the host vehicle M, in the inside of the headlight, or the like. In a case where light is radiated to the rear of the host vehicle M, the viewfinder 14 is installed in the inside of the tail light or the like. In a case where light is radiated to the right or left of the host vehicle M, the viewfinder 14 is installed on the right side or left side of the car body, the side mirror, or the vicinity of a side light. The viewfinder 14 may be provided a drive unit 14A that can change the radiation direction of light. The drive unit 14A moves the radiation direction of light to one or both of the top and bottom or the light and left within a predetermined range with respect to a reference direction.

The object recognition device 16 recognizes the position, type, speed, or the like of an object by performing a sensor fusion process on detection results based on some or all of the camera 10, the radar device 12, and the viewfinder 14. The object recognition device 16 outputs recognition result to the driving control device 100. The object recognition device 16 may output the detection results of the camera 10, the radar device 12, and the finder 14, as they are, to the driving control device 100. The object recognition device 16 may be omitted from the vehicle system 1. The camera 10 includes an infrared camera that images a change in the surface temperature of an object in addition to a camera that capture of a normal image. The camera 10 may switch between normal imaging and infrared imaging through the function of the camera.

The communication device 20 communicates another vehicle which is present in the vicinity of the host vehicle M using, for example, a cellular network, a Wi-Fi network, Bluetooth (registered trademark), dedicated short range communication (DSRC), or the like, or communicates with server devices of various types through a wireless base station.

The HMI 30 provides various types of information for an occupant of the host vehicle M, and accepts the occupant's input operation. The HMI 30 includes various types of display devices, a speaker, a buzzer, a touch panel, a switch, a key, a light-emitting device provided inside a vehicle, and the like. A portion of the configuration of the HMI 30 may be provided in the driving operator 80 (for example, a steering wheel).

The vehicle sensor 40 includes a vehicle speed sensor that detects the speed of the host vehicle M, an acceleration sensor that detects an acceleration, a yaw rate sensor that detects an angular velocity around a vertical axis, an orientation sensor that detects the direction of the host vehicle M, or the like. The acceleration includes, for example, at least one of longitudinal acceleration in the traveling direction of the host vehicle M or lateral acceleration in the lateral direction of the host vehicle M.

The navigation device 50 includes, for example, a global navigation satellite system (GNSS) receiver 51, a navigation HMI 52, and a route decision unit 53. The navigation device 50 holds first map information 54 in a storage device such as a hard disk drive (HDD) or a flash memory. The GNSS receiver 51 specifies the position of the host vehicle M on the basis of a signal received from a GNSS satellite. The position of the host vehicle M may be specified or complemented by an inertial navigation system (INS) in which an output of the vehicle sensor 40 is used. The GNSS receiver 51 may be included in the vehicle sensor 40.

The navigation HMI 52 includes a display device, a speaker, a touch panel, a key, and the like. A portion or the entirety of the navigation HMI 52 may be shared with the above-described HMI 30. The route decision unit 53 decides, for example, a route (hereinafter, a route on a map) from the position (or any input position) of the host vehicle M specified by the GNSS receiver 51 to a destination input by an occupant using the navigation HMI 52 with reference to the first map information 54. The first map information 54 is, for example, information in which a road shape is represented by a link indicating a road and nodes connected by the link. The first map information 54 may include the curvature of a road, point of interest (POI) information, or the like. The first map information 54 may include information relating to a ground feature. The information relating to a ground feature includes, for example, a ground feature ID which is identification information of a ground feature, position information of a ground feature, the attribute (genre) of a ground feature, or guidance information based on a ground feature. The ground feature includes, for example, a landmark, a sightseeing area (for example, a mountain, a waterfall, or a lake), famous architecture (for example, a temple or a bridge), or commercial facilities such as a theme park or a shopping mall. In terms of computer processing, the ground feature may be one point on a map, or may be a region having a width. The information relating to a ground feature may be set in the first map information 54 as default, or may be acquired from a map server or the like through the Internet or the like. The route on a map is output to the MPU 60. The navigation device 50 may perform route guidance using the navigation HMI 52 on the basis of the route on a map. The navigation device 50 may be realized by the function of a terminal device such as, for example, a smartphone or a tablet terminal possessed by an occupant. The navigation device 50 may transmit its current position and destination to a navigation server through the communication device 20, and acquire the same route as the route on a map from the navigation server.

The MPU 60 includes, for example, a recommended lane decision unit 61, and holds second map information 62 in a storage device such as an HDD or a flash memory. The recommended lane decision unit 61 divides the route on a map provided from the navigation device 50 into a plurality of blocks (for example, divides the route on a map every 100 [m] in a vehicle traveling direction), and decides a recommended lane for each block with reference to the second map information 62. The recommended lane decision unit 61 makes a decision on which lane from the left to travel along. In a case where a branch point is present in the route on a map, the recommended lane decision unit 61 decides a recommended lane so that the host vehicle M can travel along a rational route for advancing to a branch destination.

The second map information 62 is map information having a higher accuracy than that of the first map information 54. The second map information 62 includes, for example, information of the center of a lane, information of the boundary of a lane, or the like. The second map information 62 includes information of the number of traveling lanes or the positions thereof based on a road shape, the position of a passing lane, merging, divergence, or the like. The second map information 62 may include identification information for identifying a downhill road or an uphill road in the traveling direction of a road, information relating to the gradient of a road (the inclination of a road to a horizontal plane), the distance of a downhill road or an uphill road, or information of the height of the top or the like. The second map information 62 may include a traffic sign, road information, traffic regulations information, address information (address or zip code), facility information, telephone number information, or the like. The second map information 62 may be updated at any time by the communication device 20 communicating with another device.

The driving operator 80 includes, for example, an accelerator pedal, a brake pedal, a shift lever, a steering wheel, a variant steering wheel, a joystick, and other operators. A sensor that detects the amount of operation or the presence or absence of operation is installed on the driving operator 80, and the detection results are output to the driving control device 100, or some or all of the traveling driving force output device 200, the brake device 210, and the steering device 220.

The driving control device 100 includes, for example, a first control unit 120, a second control unit 160, an HMI control unit 180, and a storage unit 190. Each of the components except the storage unit 190 is realized by a hardware processor such as, for example, a central processing unit (CPU) executing a program (software). Some or all of these components may be realized by hardware (circuit unit; including circuitry) such as a large scale integration (LSI), an application specific integrated circuit (ASIC), a field-programmable gate array (FPGA), or a graphics processing unit (GPU), and may be realized by cooperation between software and hardware. The program may be stored in the storage unit 190 of the driving control device 100 in advance, may be stored in a detachable storage medium such as a DVD or a CD-ROM (a non-transitory storage medium), and may be installed in the storage unit 190 of the driving control device 100 by the storage medium being mounted in a drive device.

Figure 2:
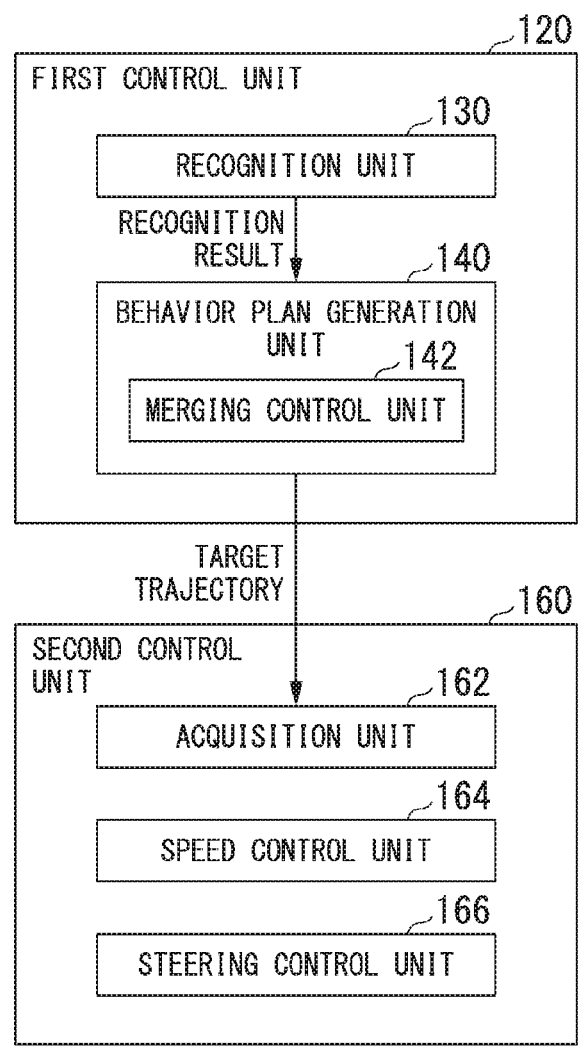
FIG. 2 is a functional configuration diagram of a first control unit and a second control unit.

FIG. 2 is a functional configuration diagram of the first control unit 120 and the second control unit 160. The first control unit 120 includes, for example, a recognition unit 130 and a behavior plan generation unit 140. A combination of the behavior plan generation unit 140 and the second control unit 160 is an example of a "driving control unit."

The first control unit 120 concurrently realizes, for example, a function based on artificial intelligence (AI) and a function based on a model imparted in advance. For example, a function of "recognizing a point of intersection" may be realized by the recognition of a point of intersection based on deep learning or the like and recognition based on conditions (such as a signal for which pattern matching is possible or a road sign) imparted in advance being concurrently executed, and being comprehensively evaluated by performing scoring on both. Thereby, the reliability of autonomous driving is secured.

The recognition unit 130 recognizes the surrounding situation of the host vehicle M on the basis of, for example, information which is input from the camera 10, the radar device 12, and the viewfinder 14 through the object recognition device 16. For example, the recognition unit recognizes the state of the position, direction, speed, acceleration, and the like of an object which is present in the vicinity of the host vehicle M. Examples of the object include a moving object such as a pedestrian or another vehicle, an obstacle such as a construction point, or a building such as a bridge. The position of the object is recognized as, for example, a position in relative coordinates with a representative point (such as the centroid or the center of a drive shaft) of the host vehicle M as an origin, and is used in control. The position of the object may be represented by a representative point such as the centroid or a corner of the object, or may be represented by a representative region. The "state" of the object may include the acceleration or jerk of the object, or "behavior state" (for example, whether it is performing or attempting to perform a lane change).

The recognition unit 130 recognizes, for example, a lane (traveling lane) in which the host vehicle M is traveling as the surrounding situation of the host vehicle M. For example, the recognition unit 130 may recognize a traveling lane by comparing a pattern of a road partition line (for example, an array of solid lines and broken lines) obtained from the second map information 62 with a pattern of a road partition line located in the vicinity of the host vehicle M which is recognized from an image captured by the camera 10. The recognition unit 130 may recognize a traveling lane by recognizing a driving boundary (road boundary) including a road partition line, a shoulder, a curbstone, a median strip, a guardrail, or the like without being limited to the recognition of a road partition line. In this recognition, the position of the host vehicle M acquired from the navigation device 50 or processing results based on an INS may be added. The recognition unit 130 may recognize the width, height, shape, or the like of an obstacle or a building on the basis of an image captured by the camera 10, or recognize characters, signs or the like drawn on the road surface of a road. The recognition unit 130 may recognize, for example, a merging point, a divergence point, the road shape of a lane after merging (for example, whether it is a sloping road (uphill or downhill)), or the like on the basis of one or both of the second map information 62 or an image captured by the camera 10. The recognition unit 130 may recognize a sidewalk, a stop line (including a temporary stop line), an obstacle, a red light, a tollbooth, a road structure, and other road events.

Upon recognizing a traveling lane, the recognition unit 130 recognizes the position or posture of the host vehicle M with respect to the traveling lane. The recognition unit 130 may recognize, for example, deviation of the host vehicle M from the center of the lane which is a reference point, and an angle formed with respect to a line aligned with the center of the lane of the host vehicle M in its traveling direction as the relative position and posture of the host vehicle M with respect to the traveling lane. Instead, the recognition unit 130 may recognize the position of the reference point of the host vehicle M or the like with respect to either lateral end portion (a road partition line or a road boundary) of the traveling lane as the relative position of the host vehicle M with respect to the traveling lane. The recognition unit 130 may recognize structures on a road (such as, for example, a telephone pole or a median strip) on the basis of the first map information 54 or the second map information 62.

The behavior plan generation unit 140 generates a target trajectory along which the host vehicle M will travel in the future automatically (irrespective of a driver's operation) so that the host vehicle M travels along the recommended lane decided by the recommended lane decision unit 61 in principle and can cope with the peripheral situation of the host vehicle. The target trajectory includes, for example, a speed element. For example, the target trajectory may be represented as a trajectory obtained by arranging points (trajectory points) at which the host vehicle M will arrive in order. The trajectory points are points at which the host vehicle M will arrive after predetermined traveling distances (for example, approximately every several [m]) which is a distance along a road. Separately from the trajectory points, a target speed and a target acceleration for each predetermined sampling time (for example, approximately several tenths of a [sec]) are generated as a portion of the target trajectory. The trajectory points may be positions at which the host vehicle M will arrive at sampling times for respective predetermined sampling times. In this case, information of target speed or target acceleration is represented by an interval between trajectory points.

The behavior plan generation unit 140 may set autonomous driving events when generating a target trajectory. Examples of autonomous driving events include a constant-speed traveling event, a low-speed following traveling event, a lane change event, a diverging event, a merging event, a contact avoidance event, and the like. The merging event is, for example, an event of causing the host vehicle M to merge into a main line at a merging point. The behavior plan generation unit 140 generates a target trajectory according to a started event. The function of a merging control unit 142 of the behavior plan generation unit 140 will be described later.

The second control unit 160 controls the traveling driving force output device 200, the brake device 210, and the steering device 220 so that the host vehicle M passes along the target trajectory generated by the behavior plan generation unit 140 according to scheduled times.

The second control unit 160 includes, for example, an acquisition unit 162, a speed control unit 164, and a steering control unit 166. The acquisition unit 162 acquires information of the target trajectory (trajectory point) generated by the behavior plan generation unit 140, and stores the acquired information in a memory (not shown). The speed control unit 164 controls the traveling driving force output device 200 or the brake device 210 on the basis of a speed element associated with the target trajectory stored in the memory. The steering control unit 166 controls the steering device 220 in accordance with the bent state of the target trajectory stored in the memory. The processes of the speed control unit 164 and the steering control unit 166 are realized by, for example, a combination of feedforward control and feedback control. As an example, the steering control unit 166 executes a combination of feedforward control according to the curvature of a road in front of the host vehicle M and feedback control based on deviation from the target trajectory.

Referring back to FIG. 1, the HMI control unit 180 causes the HMI 30 to notify an occupant of predetermined information. The predetermined information is, for example, information relevant to traveling of the host vehicle M such as information relating to the state of the host vehicle M or information relating to driving control. The predetermined information may include information that is not relevant to traveling of the host vehicle M, such as a television program, or content stored in a storage medium such as a DVD (for example, a movie). The HMI control unit 180 may output information accepted by the HMI 30 to the communication device 20, the navigation device 50, the first control unit 120, or the like.

The storage unit 190 is realized by, for example, a non-volatile storage device such as a read only memory (ROM), an electrically erasable and programmable read only memory (EEPROM), or an HDD, and a volatile storage device such as a random access memory (RAM) or a register. For example, information for realizing driving control of the host vehicle M or other information of various types is stored in the storage unit 190.

The traveling driving force output device 200 outputs a traveling driving force (torque) for a vehicle to travel to a driving wheel. The traveling driving force output device 200 includes, for example, a combination of an internal-combustion engine, an electric motor, a transmission or the like, and an electronic control unit (ECU) that controls these components. The ECU controls the above components in accordance with information which is input from the second control unit 160 or information which is input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor in accordance with the information which is input from the second control unit 160 or the information which is input from the driving operator 80, and causes a brake torque according to a braking operation to be output to each wheel. The brake device 210 may include a mechanism that transfers hydraulic pressure generated by the operation of a brake pedal included in the driving operator 80 through a master cylinder to the cylinder as a backup. The brake device 210 is not limited to the above-described configuration, and may be an electronic control type hydraulic brake device that controls an actuator in accordance with the information which is input from the second control unit 160 and transfers hydraulic pressure of the master cylinder to the cylinder.

The steering device 220 includes, for example, a steering ECU and an electric motor. The electric motor changes the direction of a turning wheel, for example, by causing a force to act on a rack and pinion mechanism. The steering ECU drives the electric motor in accordance with the information which is input from the second control unit 160 or the information which is input from the driving operator 80, and changes the direction of the turning wheel.

[Function of Merging Control Unit]

Next, the details of the function of the merging control unit 142 will be described. The function of the merging control unit 142 shown below may be a function which is executed in a merging event, or may be a function in other merging control.

Figure 3:
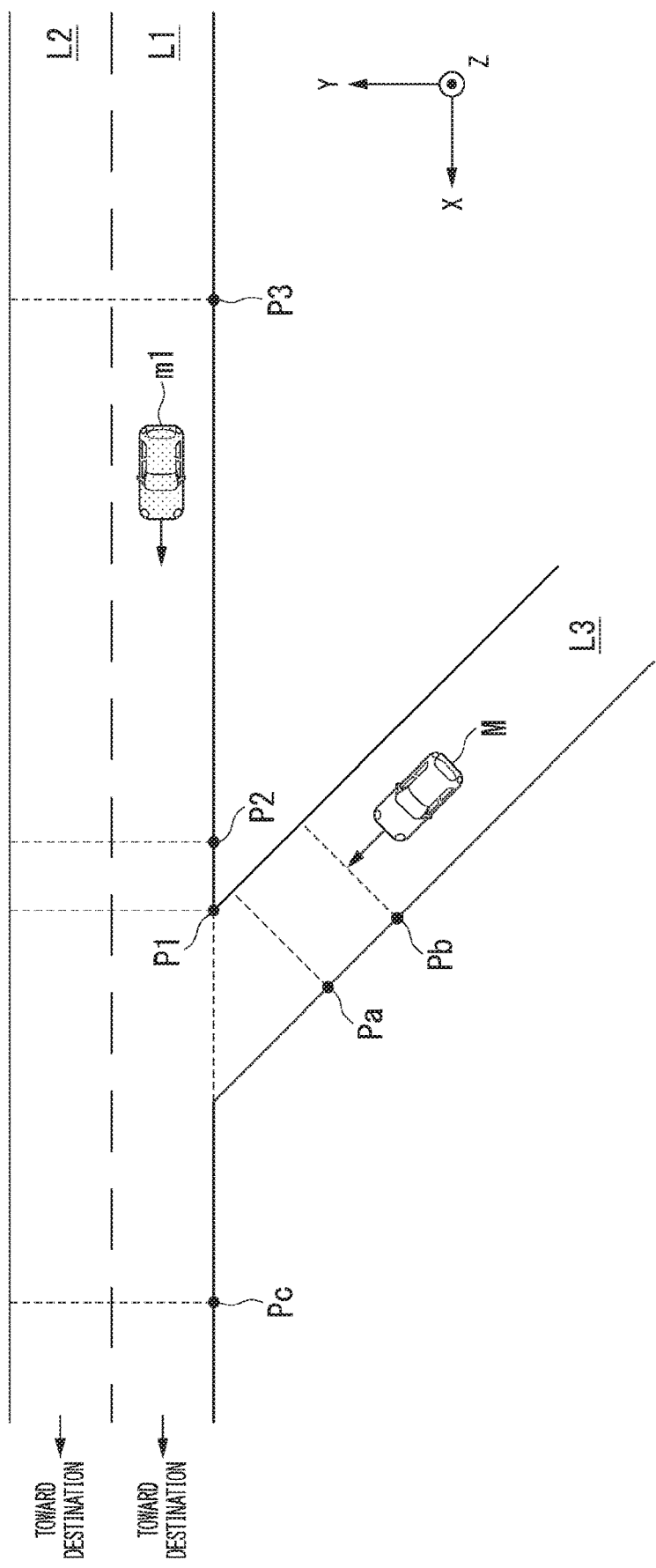
FIG. 3 is a diagram showing processes which are performed by a merging control unit.

For example, in a case where the host vehicle M merges into a main line (an example of a second lane) from a merging lane (an example of a first lane) in which the host vehicle is traveling, the merging control unit 142 generates a target trajectory on the basis of a predetermined condition. FIG. 3 is a diagram showing processes which are performed by the merging control unit 142. The example of FIG. 3 shows a main line (lanes L1 and L2) extending in an X-axis direction and a merging lane (lane L3) that merges from the left side in the traveling direction of the lane L1. In the example of FIG. 3, the host vehicle M is assumed to execute autonomous driving along a route to a destination which is set by the navigation device 50, and to be traveling in the lane L3 toward a merging point P1. The merging point P1 is a point at which the lane L1 and the lane L3 are connected to each other. The merging point P1 may be defined as the position of a line extending from the connection point in the direction of a vehicle width (a Y-axis direction in the drawing) when viewed from the lanes L1 and L2, or may be defined as the position of a line obtained by linking respective points at which right and left road partition lines partitioning the lane L3 are connected to the lane L1 when viewed from the lane L3. In the example of FIG. 3, it is assumed that a stop line is not present in the vicinity of the merging point P1 (at a position within a predetermined range from the merging point P1). In the example of FIG. 3, points P2, P3, and Pa to Pc may be positions of lines extending in the direction of a vehicle width. In the example of FIG. 3, another vehicle m1 is assumed to be traveling in the lane L1.

Figure 4:
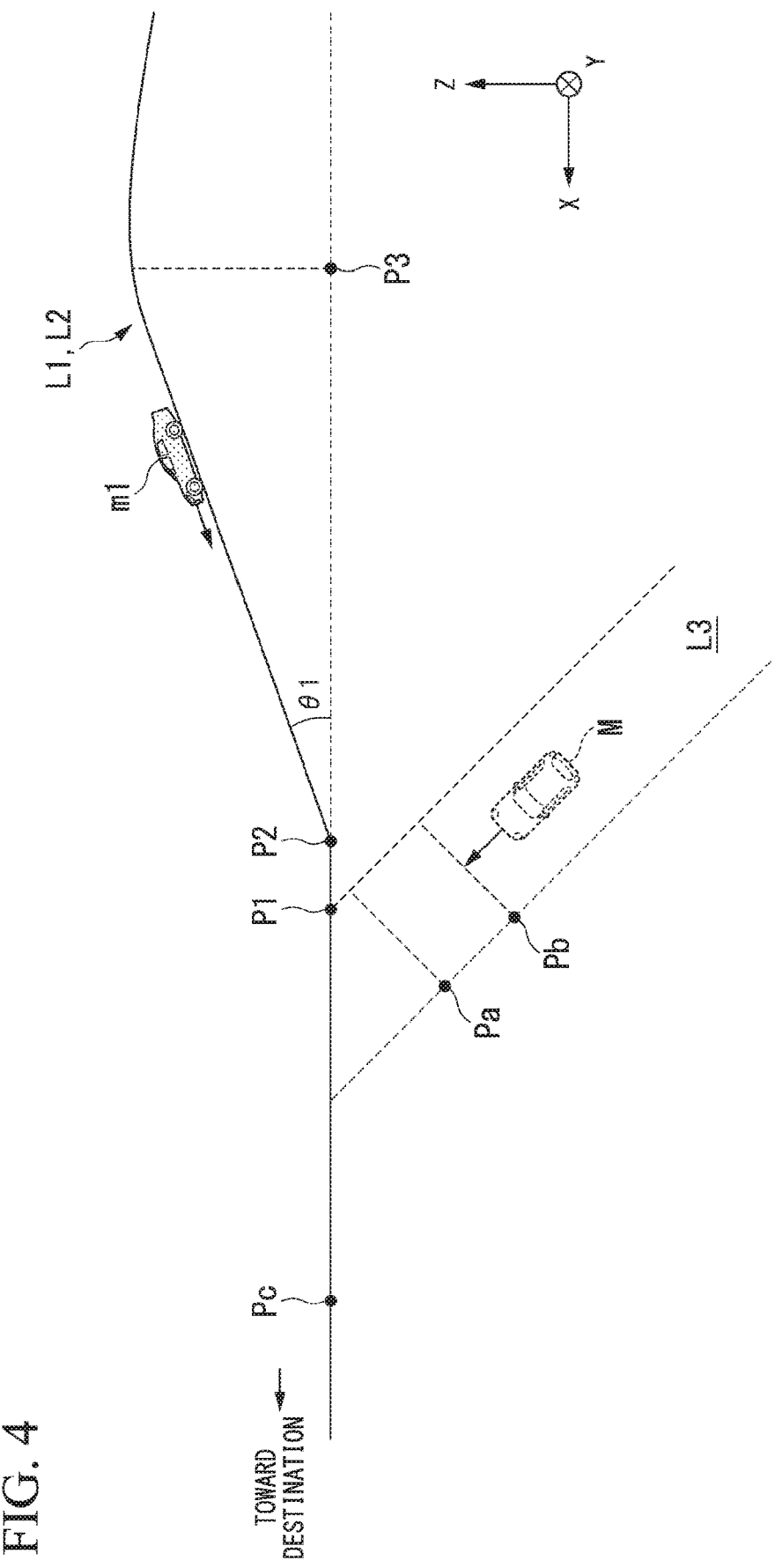
FIG. 4 is a diagram of a plurality of lanes viewed from a lateral direction (Y-axis direction).

FIG. 4 is a diagram of the lanes L1 and L2 viewed from a lateral direction (a Y-axis direction in the drawing). In the example of FIG. 4, for convenience, the lane L3 and the host vehicle M conforming to the direction of the same three-dimensional (XYZ) axis as FIG. 3 are shown so that the positions of the lane L3 and the host vehicle M with respect to the lanes L1 and L2 can be ascertained. The lanes L1 and L2 form a downhill road in a section from the point P2 to the point P3 as shown in FIG. 4.

In this situation, first, the merging control unit 142 determines whether the host vehicle merges into the lane L1 from the lane L3 on the basis of a route to a destination. In a case where it is determined that the host vehicle merges into the lane L1, the merging control unit 142 determines whether a predetermined section of the lane L1 before merging is downhill. The predetermined section before merging is, for example, a road section in front of the merging point P1, and is a section in which a distance from the merging point P1 is equal to or less than a threshold. For example, the merging control unit 142 refers to the second map information 62 on the basis of information relating to the current position and the traveling direction of the host vehicle M, and acquires information relating to the gradient of the predetermined section of the lane L1 before merging. In a case where an inclination angle $\theta 1$ of a road surface included in the information relating to a gradient is larger than a threshold angle $\theta th$, the merging control unit 142 determines that the predetermined section of the lane L1 before merging is downhill. The merging control unit 142 may determine whether the predetermined section of the lane L1 before merging is downhill on the basis of identification information for identifying whether the road is downhill or uphill included in the second map information 62. The merging control unit 142 may perform an analysis based on pattern matching or the like on the basis of an image captured by the camera 10, and determine whether the predetermined section of the lane L1 before merging is downhill on the basis of an analysis result. In a case where it is recognized that there is a bridge in front of the merging point P1 on the basis of the second map information 62, the merging control unit 142 may determine that the road is downhill due to the bridge.

Next, in a case where it is determined that the predetermined section of the lane L1 before merging is downhill, the merging control unit 142 makes the speed or acceleration of the host vehicle M higher than in a case where the predetermined section before merging is not downhill. A road which is not downhill includes a road having a low gradient degree in which the inclination angle θ1 is equal to or less than the predetermined angle θth, or an uphill road. For example, in a case where the section of the lane L1 before merging is downhill, the merging control unit 142 sets a target speed higher than a target speed in a case where the section before merging is not downhill, and generates a target trajectory on the basis of the set target speed. The speed control unit 164 controls the speed or acceleration of the host vehicle M so as to approximate the target speed on the basis of the generated target trajectory. As a result, the speed or acceleration of the host vehicle M during merging becomes higher. Instead of the target speed, the merging control unit 142 may set a target acceleration higher than a target acceleration in a case where the section before merging is not downhill. In the following, an example in which a target speed is set higher will be mainly described.

Figure 5:
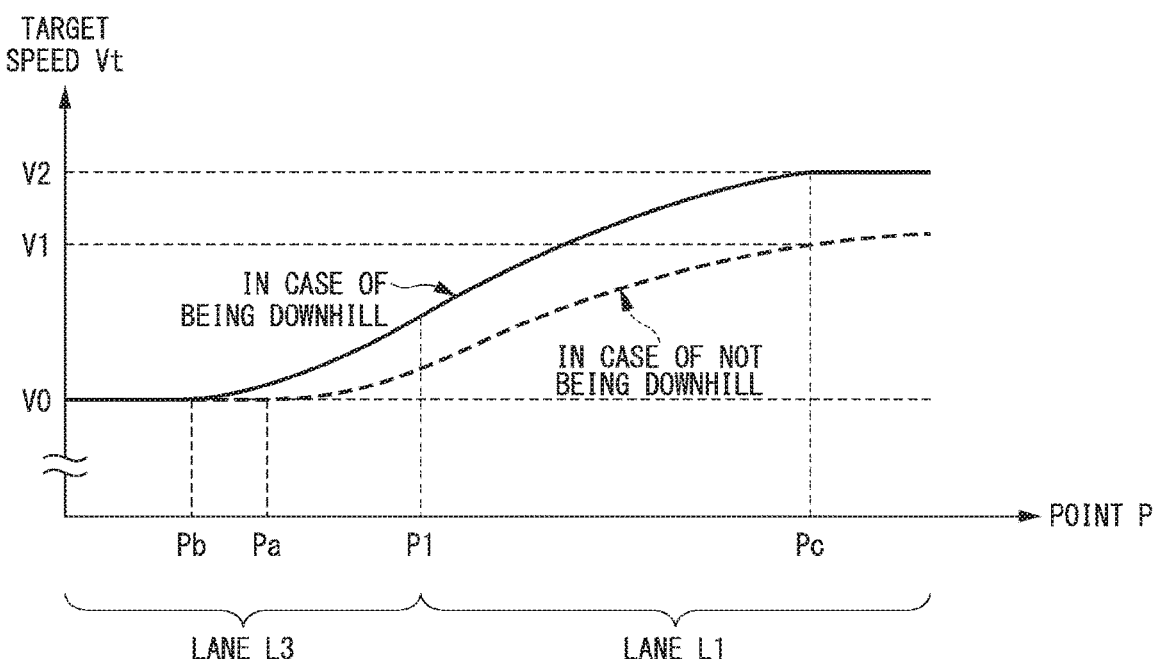
FIG. 5 is a diagram showing a change in the speed of a host vehicle during merging into a lane.

FIG. 5 is a diagram showing a change in the speed of the host vehicle M during merging into the lane L1. In FIG. 5, the horizontal axis represents a point P at which the host vehicle M travels, and the vertical axis represents a target speed Vt of the host vehicle M. It is assumed that, on the horizontal axis, the left side of the merging point P1 represents points in the lane L3, and the right side of the merging point P1 represents points in the lane L1. In the example of FIG. 5, the host vehicle M is assumed to be traveling at a speed V0 in the lane L3 before merging.

In a case where the predetermined section of the lane L1 before merging is not downhill, the merging control unit 142 sets a target speed at each point so that the target speed Vt is set to a speed V1 at the point Pc of the lane L1 after merging. As a result, the speed control unit 164 executes feedback control of the speed of the host vehicle M so as to attain the speed V1 at the point Pc according to the set target speed.

In a case where the section of the lane L1 before merging is downhill, the merging control unit 142 sets a target speed at each point so that the target speed Vt at the point Pc is set to a speed V2 higher than the speed V1 in a case where it is not downhill. The magnitude of the target speed may be adjusted on the basis of at least one of, for example, the gradient degree of the downhill road of the lane L1, the height of the top of the downhill road of the lane L1, or the distance of the downhill road. Thereby, it is possible to execute more appropriate merging control on the basis of the road situation. The upper limit of the magnitude of the target speed is set on the basis of, for example, the speed limit of the lane L1, the road shape of a merging point, or the like. Thereby, the host vehicle M can merge into the lane L1 with smoother behavior.

In a case where the predetermined section of the lane L1 before merging is downhill, the merging control unit 142 may make a timing at which acceleration control is started earlier than a timing in a case where the predetermined section before merging is not downhill. In the example of FIG. 5, in a case where the predetermined section of the lane L1 before merging is downhill, a speed during entrance into the lane L1 is made higher by starting an acceleration at the point Pb in front of the acceleration start position Pa in a case where it is not downhill with respect to the merging point P1. The speed during entrance is, for example, a speed at a point in time when at least a portion of the host vehicle M is present on the lane L1. Thereby, the merging control unit 142 suppresses a sudden acceleration of the host vehicle M during merging, thereby allowing smooth speed control to be executed.

By performing merging control based on the above-described speed control, it is possible to reduce a risk of the host vehicle M and another vehicle m1 coming into contact with each other even in a case where another vehicle m1 traveling on a downhill road gains acceleration due to the downhill road. Even in a situation in which another vehicle which is present above a downhill road or on an uphill road behind the downhill road is not able to be detected by the sensor unit, it is possible to reduce a risk of coming into contact with another vehicle by making a speed during merging higher than in the case of not being downhill. In a case where an object such as another vehicle m1 is recognized in the vicinity of the host vehicle M by the recognition unit 130, the merging control unit 142 generates a target trajectory for avoiding contact with an object in addition to the above-described speed control, and executes driving control along the generate target trajectory.

Figure 6:
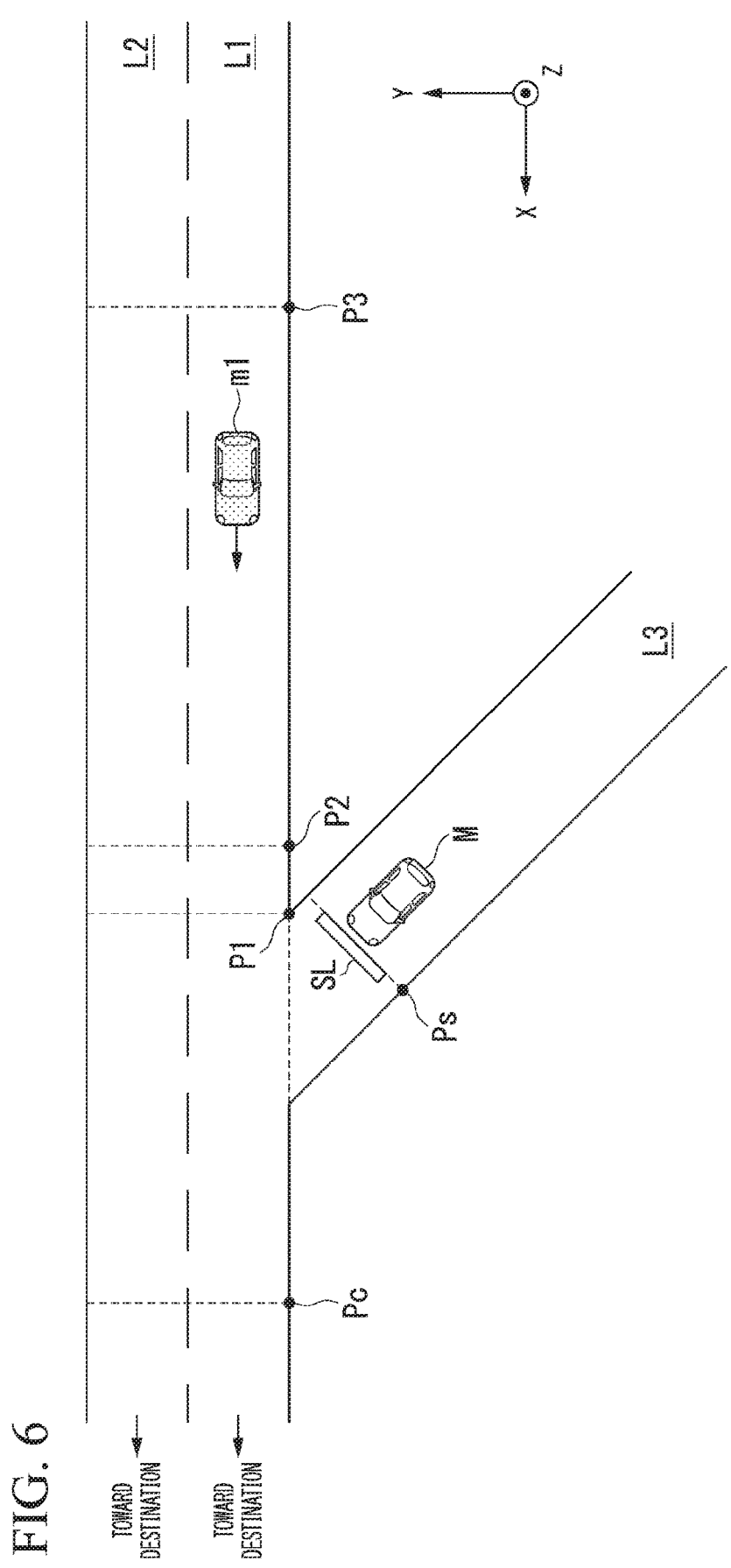
FIG. 6 is a diagram showing processes which are performed by the merging control unit in a case where a stop line is present in the vicinity of a merging point.

Next, processes of the merging control unit 142 in a case where a stop line is present in the vicinity of the merging point P1 will be described. FIG. 6 is a diagram showing processes of the merging control unit 142 in a case where a stop line SL is present in the vicinity of the merging point P1. In the example of FIG. 6, the stop line SL is assumed to be drawn at a point Ps in front of the merging point P1 in the lane L3.

In this case, first, the merging control unit 142 determines whether a stop line is present in the vicinity of the merging point P1 on the basis of a recognition result of the recognition unit 130. The stop line may be a stop line drawn on a road or a character of "STOP.". It may be determined whether a road sign for stopping a vehicle is recognized instead of the stop line. In a case where the stop line is not present, the merging control unit 142 executes speed control as shown in FIGS. 3 to 5 described above. In a case where the stop line SL is present, the merging control unit 142 generates a target trajectory for stopping the host vehicle M in front (for example, several centimeters to several tens of centimeters ahead) of the point Ps at which the stop line SL is present. In a case where the host vehicle M is caused to merge into the lane L1 from a stop position, and the predetermined section of the lane L1 before merging is downhill, the merging control unit 142 makes the speed or acceleration of the host vehicle M after entrance into the lane L1 higher than in a case where it is not downhill. The wording "after entrance" refers to, for example, a time after entrance.

Figure 7:
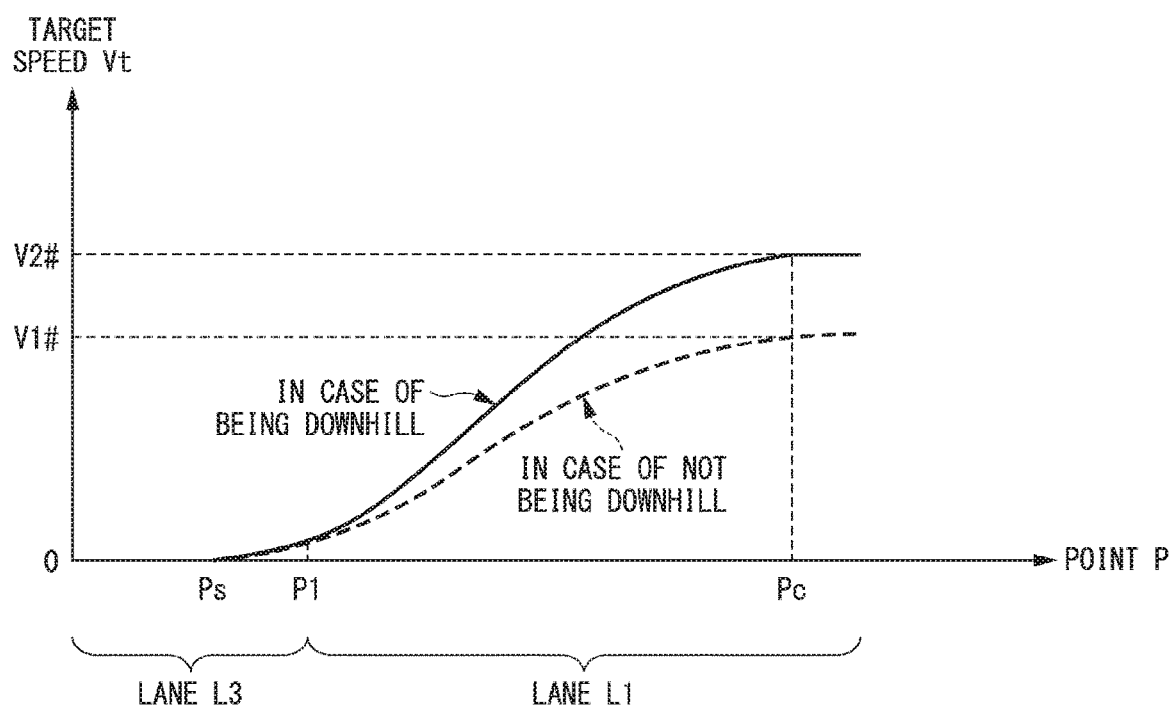
FIG. 7 is a diagram showing a change in the speed of the host vehicle in a case where the stop line is present in the vicinity of the merging point.

FIG. 7 is a diagram showing a change in the speed of the host vehicle M in a case where the stop line SL is present in the vicinity of the merging point P1. In FIG. 7, the horizontal axis represents a point P at which the host vehicle M travels, and the vertical axis represents a target speed Vt of the host vehicle M. It is assumed that, on the horizontal axis, the left side of the merging point P1 represents points in the lane L3, and the right side of the merging point P1 represents points in the lane L1. The example of FIG. 7 shows a state of a change in the speed of the host vehicle M after temporary stop (speed V=0) at the point Ps.

The merging control unit 142 temporarily stops the host vehicle M in front of the point Ps on the stop line SL, and then generates a target trajectory in which the host vehicle passes through the merging point P1 at a predetermined speed and enters the lane L1. In a case where the host vehicle M enters the lane L1, and then the predetermined section of the lane L1 before merging is not downhill, the merging control unit 142 sets a target speed so that the target speed Vt of the host vehicle M is set to a speed V1 # at the point Pc, and generates a target trajectory on the basis of the set target speed.

In a case where the host vehicle M enters the lane L1, and then the predetermined section of the lane L1 before merging is downhill, the merging control unit 142 sets a target speed so that the target speed Vt of the host vehicle M is set to a speed V2 # higher than the speed V1 # at the point Pc, and generates a target trajectory on the basis of the set target speed. Thereby, in a case where the stop line SL is present at the merging point P1, as shown in FIG. 7, it is possible to execute more appropriate driving control by increasing an acceleration after entrance into the lane L1.

Figure 8:
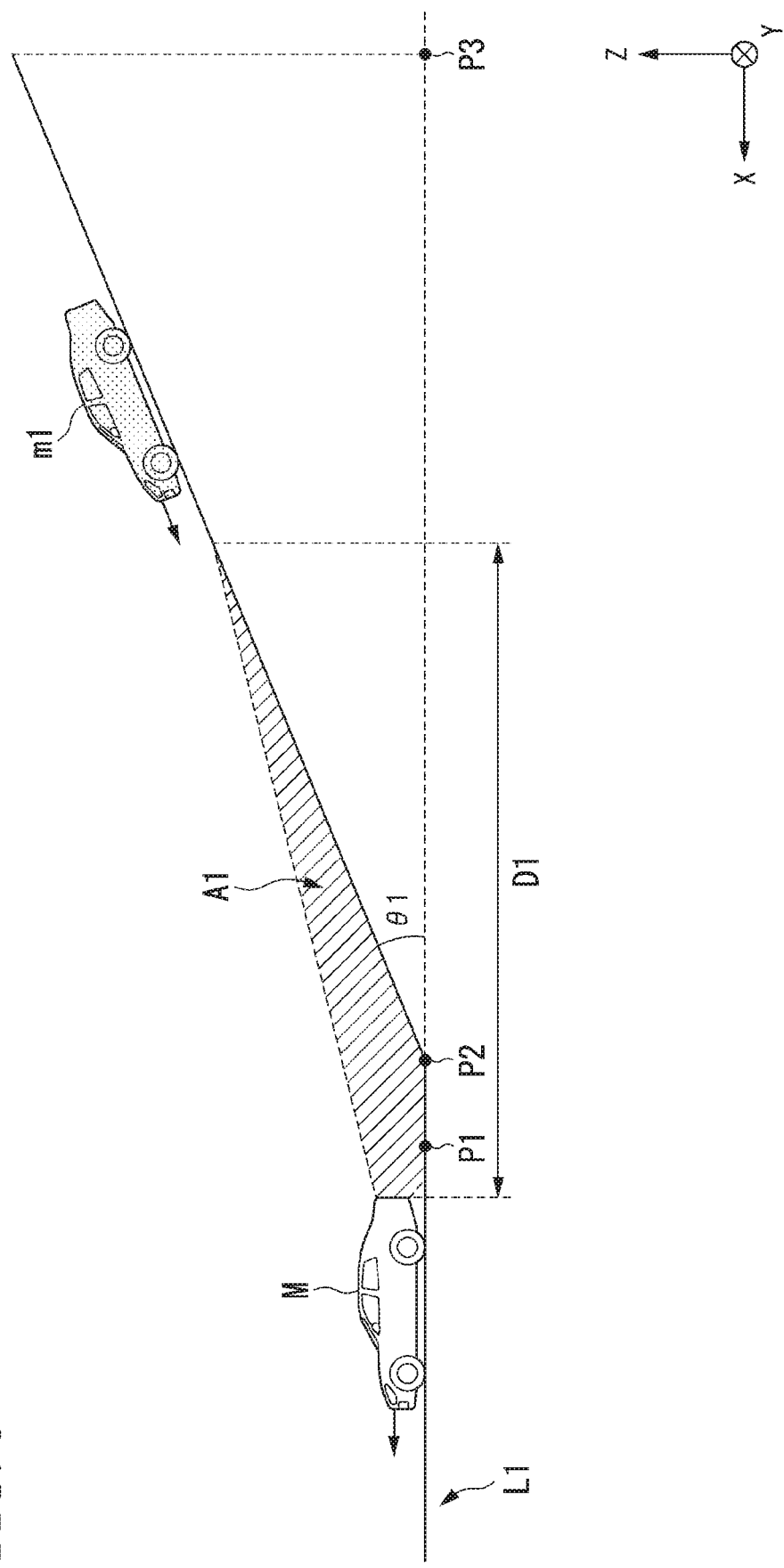
FIG. 8 is a diagram showing a detection distance based on a sensor unit.

The merging control unit 142 may control the magnitude of a speed at which the host vehicle M enters the lane L1 on the basis of a detection distance of a road shape of a predetermined section of the lane L1 before merging which is detected by the camera 10, the radar device 12, or the viewfinder 14 during merging. FIG. 8 is a diagram showing a detection distance based on the sensor unit. The example of FIG. 8 shows a detection range A1 in the rear of the host vehicle M after the host vehicle M merges into the lane L1 (a predetermined section of the lane L1 before merging). This detection range A1 is, for example, a range which is detected by the camera 10 installed on the upper portion of the rear windshield, the radar device 12 installed in the rear of the car body, or the viewfinder 14 installed inside a tail light. The detection range A1 differs depending on a distance from the merging point P1, the gradient degree (inclination angle θ1) of a downhill road, or the like The merging control unit 142 acquires a detection distance D1 at which a distance from the host vehicle M becomes maximum in the detection range A1 in the rear of the host vehicle M which can be detected by the sensor unit. The merging control unit 142 then sets a target speed on the basis of the detection distance D1. For example, as the detection distance D1 becomes shorter, the gradient degree of a downhill road becomes higher (sudden gradient), and thus the speed of the following vehicle (for example, another vehicle m1) is estimated to have a tendency to become higher. As the detection distance D1 becomes shorter, there is the possibility of the recognition unit 130 not being able to recognize the following vehicle which is present closer to the host vehicle M. Therefore, as the detection distance D1 becomes shorter, the merging control unit 142 performs an adjustment so that the speed or acceleration of the host vehicle M after merging becomes higher. Thereby, it is possible to suppress contact with the following vehicle, and to execute smooth merging control.

Figure 9:
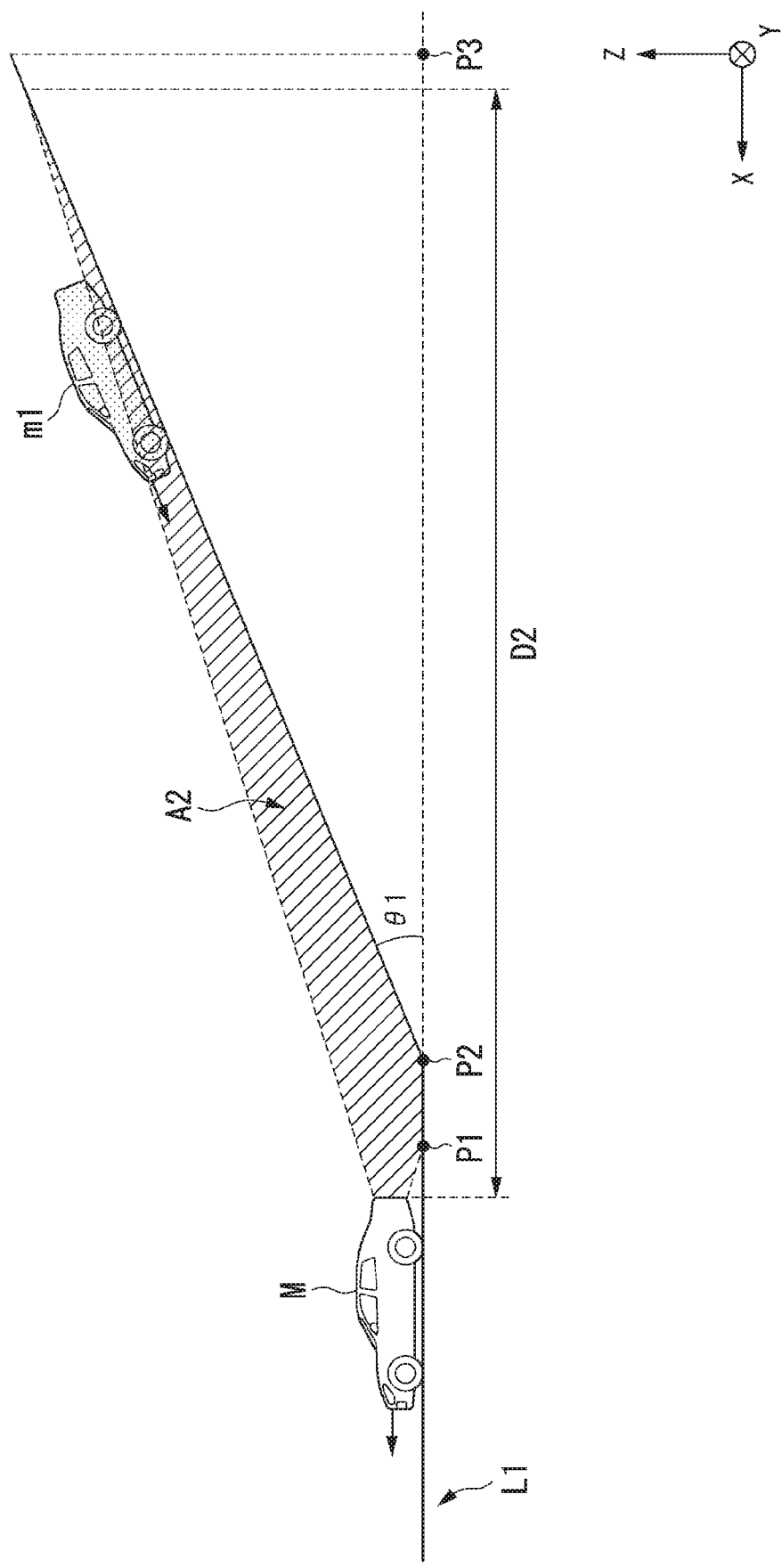
FIG. 9 is a diagram showing a detection distance in a case where the detection direction of the sensor unit is turned upward.

In a case where the predetermined section of the lane L1 before merging is downhill, the merging control unit 142 may turn the detection direction of the sensor unit upward more than in a case where the predetermined section before merging is not downhill. FIG. 9 is a diagram showing a detection distance in a case where the detection direction of the sensor unit is turned upward. The example of FIG. 9 shows a detection range A2 in the rear of the host vehicle M in a case where the host vehicle M is present at the same point as that in FIG. 8.

In a case where it is determined that the predetermined section of the merging lane L1 before merging is a sloping road, the merging control unit 142 drives at least one drive unit of the drive units 10A, 12A, and 14A of the camera 10, the radar device 12, and the viewfinder 14, respectively, installed at positions where the rear of the host vehicle M serves as a detection target, and moves the detection range of target devices (the camera 10, the radar device 12, and the viewfinder 14) upward. In this case, the merging control unit 142 may turn the detection range upward by a fixed angle in a reference direction, or may set an angle turned upward on the basis of at least one of the gradient degree of a downhill road, the height of the top of the downhill road, and the distance of the downhill road. Thereby, as shown in FIG. 9, it is possible to detect an object in the detection range A2 including a portion located further upward than the detection range A1 shown in FIG. 8, and to early detect another vehicle m1 which is present above a downhill road. Therefore, the host vehicle M can perform appropriate driving control based on a detection result.

The merging control unit 142 may recognize a direction in which a downhill road is present at a point by a predetermined distance ahead from the merging point P1 at a point in time when the host vehicle M is traveling in the lane L3 instead of (or in addition to) the above-described direction control of the sensor unit, and turn upward at least one of the camera 10, the radar device 12, and the viewfinder 14 in a detection range included in the recognized direction. For example, in a case where the host vehicle M is present at the point Ps shown in FIG. 6, the merging control unit 142 turns upward the at least one of the camera 10, the radar device 12, and the viewfinder 14 in which the right side of the host vehicle M is included in a detection range.

As described above, instead of turning a target device upward, the merging control unit 142 may expand the detection range of the target device upward through switching between modes of the target device or the like. After merging is ended and then a predetermined time has elapsed, the merging control unit 142 moves the detection direction of the sensor unit turned upward to an original direction (for example, a reference direction).

[Process Flow]

Figure 10:
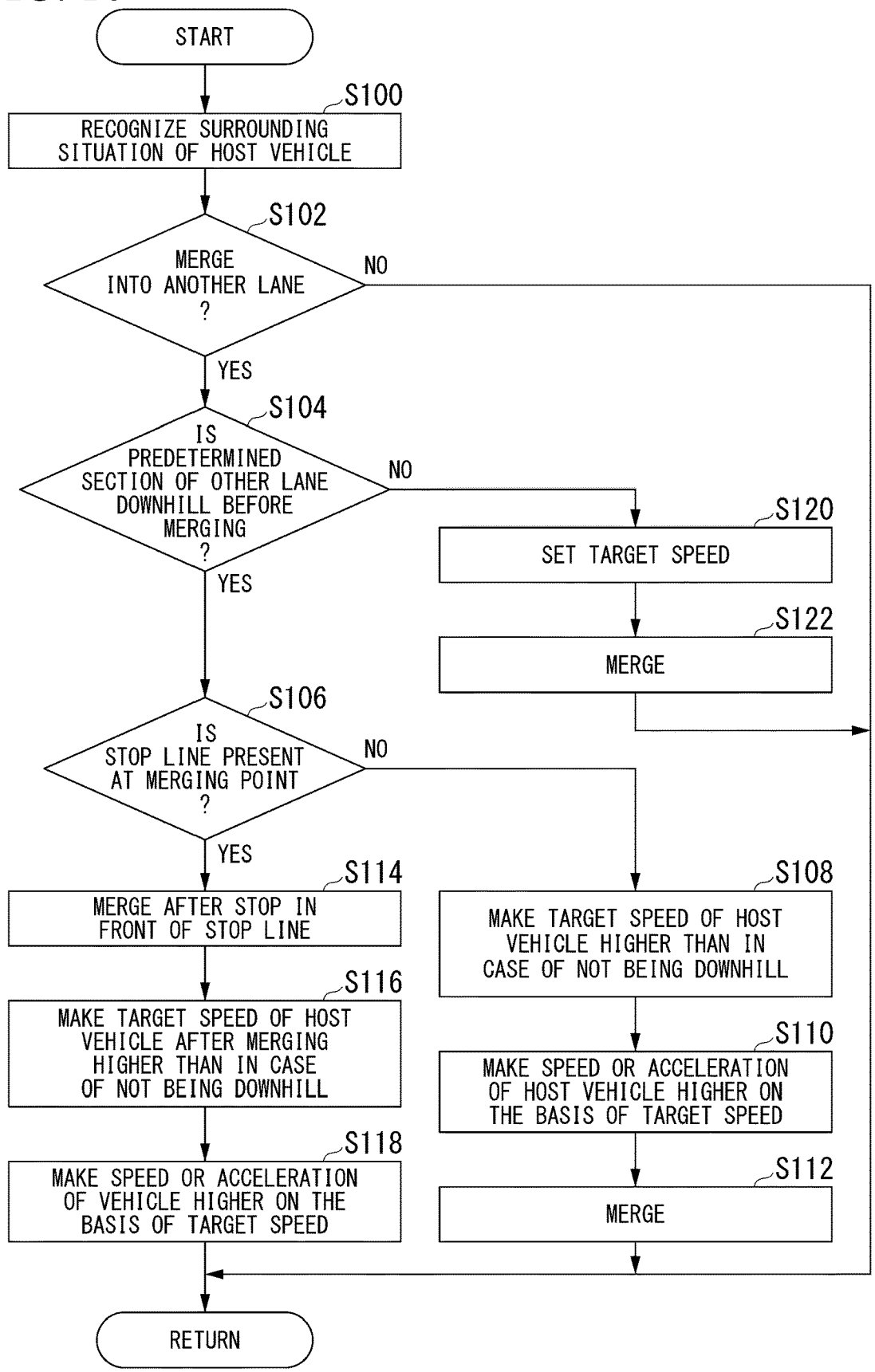
FIG. 10 is a flow chart showing a flow of processes which are executed by a driving control device of the embodiment.

FIG. 10 is a flow chart showing a flow of processes which are executed by the driving control device 100 of the embodiment. The processes of the present flow chart will be described mainly with a focus on a speed control process based on autonomous driving during merging. The processes of the present flow chart may be repeatedly executed, for example, in a predetermined period or at a predetermined timing. In the example of FIG. 10, driving control is assumed to be executed on the basis of a route to a destination.

First, the recognition unit 130 recognizes the surrounding situation of the host vehicle M (step S100). Next, the merging control unit 142 determines whether the host vehicle merges into another lane from a traveling lane on the basis of the surrounding situation recognized by the recognition unit 130 (step S102). In a case where it is determined that the host vehicle merges into another lane, the merging control unit 142 determines whether a predetermined section of a lane after merging before merging is downhill (step S104). In a case where it is determined that the predetermined section of the other lane is downhill before merging, the merging control unit 142 determines whether a stop line is present at a merging point (step S106).

In a case where it is determined that the stop line is not present at the merging point, the merging control unit 142 sets a target speed of the host vehicle M higher than a target speed in the case of not being downhill (step S108). Next, the merging control unit 142 increases the speed or acceleration of the host vehicle M on the basis of the set target speed (step S110), and executes driving control for performing merging into another lane (step S112).

In the process of step S106, in a case where it is determined that the stop line is present at the merging point, the merging control unit 142 performs merging control after the host vehicle is stopped in front of the stop line (step S114). Next, the merging control unit 142 sets the target speed of the host vehicle M after merging higher than a target speed in the case of not being downhill (step S116). Next, the merging control unit 142 executes driving control for increasing the speed or acceleration of the host vehicle M on the basis of the set target speed (step S118).

In the process of step S104, in a case where it is determined that the predetermined section of the other lane is not downhill before merging, the second control unit 160 sets a target speed based on the surrounding situation by a reference set in advance (step S120), and executes driving control for performing merging on the basis of the set target speed (step S122). Thereby, the processes of the present flow chart are ended. In the process of step S102, in a case where it is determined that the host vehicle does not merge into another lane, the processes of the present flow chart are ended.

According to the above-described embodiment, the driving control device 100 can execute more appropriate driving control on the basis of the road situation during merging. Specifically, in the embodiment, in a case where the predetermined section of the main line before merging is downhill during merging into the main line from the merging lane, the driving control device 100 makes a speed or acceleration during merging higher than in the case of not being downhill on the basis of the road situation regardless of the presence or absence of a rearward vehicle. Thereby, even in a case where a rearward vehicle which is present above a downhill road or on an uphill road behind the downhill road is not able to be detected by the sensor unit, or a case where the rearward vehicle is accelerating due to the downhill road, it is possible to execute merging control through an appropriate speed. According to the driving control device 100 of the embodiment, it is possible to execute merging control through a more appropriate speed by adjusting the degree of the magnitude of the speed or acceleration of the host vehicle M on the basis of the presence or absence of the stop line at the merging point, a detection distance based on the sensor unit, the gradient degree of a downhill road, the height of the top of the downhill road, the distance of the downhill road, or the like.

According to the above-described embodiment, in a case where the predetermined section of the other lane is downhill before merging, it is possible to early detect another vehicle which is present above a downhill road by turning the direction of the sensor unit upward. As a result, it is possible to execute more appropriate merging control.

In addition to the above-described control, in a case where the section of the lane L1 at the merging point or after merging is downhill, the merging control unit 142 may perform speed control different from that in a case where the section of the lane L1 at the merging point or after merging is not downhill. For example, in a case where the section of the lane L1 at the merging point or after merging is downhill, it is conceivable that acceleration due to traveling on a downhill road occurs. Therefore, in a case where the section of the lane L1 at the merging point or after merging is downhill, the merging control unit 142 adjusts the amount of increase in the speed or acceleration of the host vehicle M during merging smaller than in a case where it is not downhill on the basis of the gradient degree of the downhill road at the merging point or after merging, the distance of the downhill road, or the like.

[Hardware Configuration]

Figure 11:
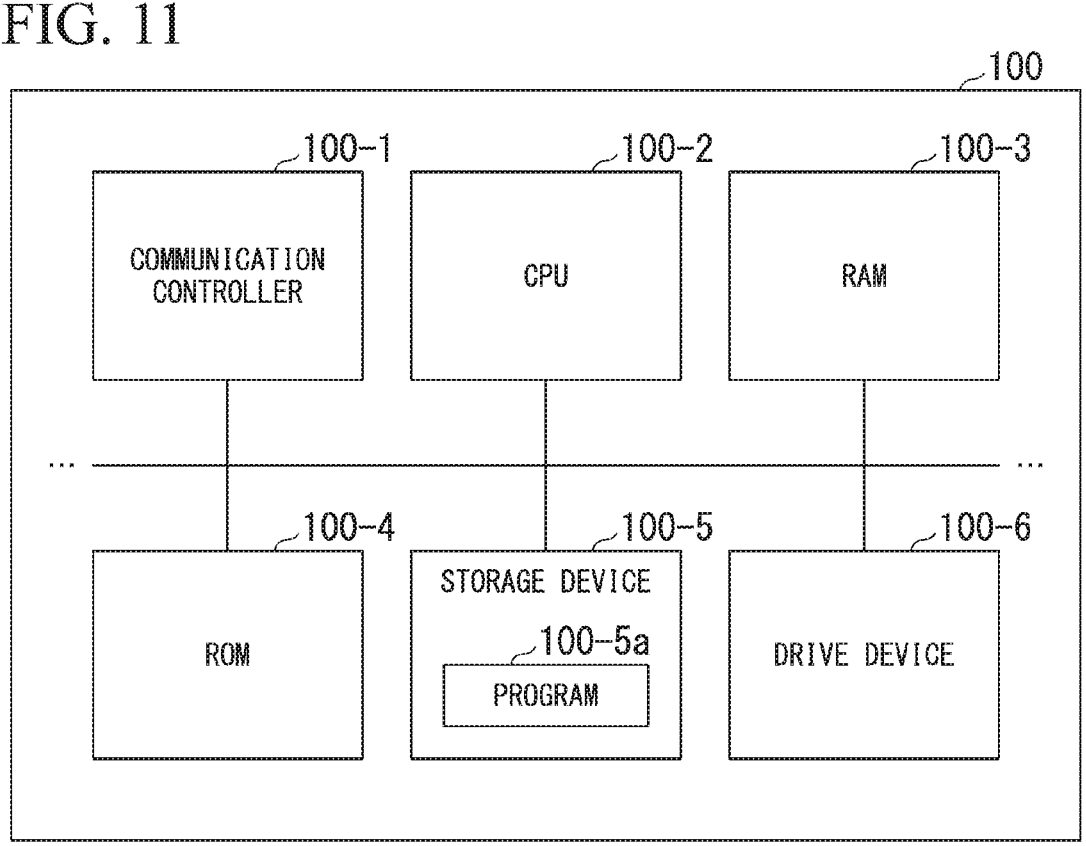
FIG. 11 is a diagram showing an example of a hardware configuration of the driving control device of the embodiment.

FIG. 11 is a diagram showing an example of a hardware configuration of the driving control device 100 of the embodiment. As shown in the drawing, the driving control device 100 is configured such that a communication controller 100-1, a CPU 100-2, a RAM 100-3 used as a working memory, a ROM 100-4 that stores a boot program or the like, a flash memory, a storage device 100-5 such as an HDD, a drive device 100-6, and the like are connected to each other through an internal bus or a dedicated communication line. The communication controller 100-1 performs communication with components other than the driving control device 100. The storage device 100-5 stores a program 100-5a executed by the CPU 100-2. This program is developed into the RAM 100-3 by a direct memory access (DMA) controller (not shown) or the like, and is executed by the CPU 100-2. Thereby, some or all of the components of the driving control device 100 are realized.

The above-described embodiment can be represented as follows.

A vehicle control device including:

a storage device having a program stored therein; and a hardware processor, wherein the hardware processor executes the program stored in the storage, to thereby recognize a surrounding situation of a vehicle, and control one or both of steering and acceleration or deceleration of the vehicle on the basis of the recognized surrounding situation, wherein, in a case where the vehicle merges into a second lane from a first lane in which the vehicle travels, and a section of the second lane before merging is downhill, a speed or acceleration of the vehicle is made higher than in a case where the section before merging is not downhill.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising a processor, the processor configured to:

recognize a surrounding situation of a vehicle; and control one or both of steering and acceleration or deceleration of the vehicle on a basis of the surrounding situation, wherein, in response to determining, based on the surrounding situation, that the vehicle is traveling in a first lane and merges into a second lane from the first lane, and a section of the second lane before merging is determined to be downhill, increasing a speed or acceleration of the vehicle during merging with respect to a case where the section before merging is not determined to be downhill, wherein the first lane ultimately terminates at a defined future distance.

2. The vehicle control device according to claim 1, wherein, in a case where the vehicle merges into the second lane from the first lane, and the section of the second lane before merging is determined to be downhill, accelerating the vehicle before merging to make a speed during entrance into the second lane higher with respect to a case where the section before merging is not determined to be downhill.

3. The vehicle control device according to claim 1, wherein, in a case where the vehicle merges into the second lane from the first lane, and the section of the second lane before merging is determined to be downhill, accelerating after entrance into the second lane with respect to a case where the section of the second lane before merging is not determined to be downhill.

4. The vehicle control device according to claim 1, further comprising a sensor unit that detects a road situation around the vehicle,
wherein the processor adjusts the speed or acceleration of the vehicle during merging on a basis of a detection distance, which is detected by the sensor unit, of the section of the second lane before merging.

5. The vehicle control device according to claim 1, further comprising a sensor unit that detects a road situation around the vehicle,
wherein, in a case where the vehicle merges into the second lane from the first lane, and the section of the second lane before merging is downhill, the processor turns a detection direction of the sensor unit upward more than in a case where the section before merging is not determined to be downhill.

6. The vehicle control device according to claim 1, wherein the processor adjusts a magnitude of the speed or acceleration of the vehicle during merging on a basis of at least one of a gradient degree of the downhill section, a height of a top of the downhill section, or a distance of the downhill section.

7. The vehicle control device according to claim 1, wherein, in a case where the vehicle merges into the second lane from the first lane, and the section of the second lane before merging is determined to be downhill, increasing a target speed or target acceleration of the vehicle during merging with respect to a case where the section before merging is not determined to be downhill.

8. The vehicle control device according to claim 1,
wherein, in response to determining, based on the surrounding situation, that the vehicle is traveling in the first lane and merges into the second lane from the first lane, and a section of the second lane before merging is not determined to be downhill, increasing a speed of the vehicle before merging so that a target speed or target acceleration of the vehicle during merging is set to a first speed or acceleration, and
wherein, in response to determining, based on the surrounding situation, that the vehicle is traveling in the first lane and merges into the second lane from the first lane, and a section of the second lane before merging is determined to be downhill, increasing a speed of the vehicle before merging so that the target speed or target acceleration of the vehicle during merging is set to a second speed or acceleration higher than the first speed or acceleration.

9. A vehicle control method causing a computer, comprising:
recognizing a surrounding situation of a vehicle; and
controlling one or both of steering and acceleration or deceleration of the vehicle on a basis of the surrounding situation,
wherein, in response to determining, based on the surrounding situation, that the vehicle is traveling in a first lane and merges into a second lane from the first lane, and a section of the second lane before merging is determined to be downhill, increasing a speed or acceleration of the vehicle during merging with respect to a case where the section before merging is not determined to be downhill, wherein the first lane ultimately terminates at a defined future distance.

10. The vehicle control method according to claim 9,
wherein, in response to determining, based on the surrounding situation, that the vehicle is traveling in the first lane and merges into the second lane from the first lane, and a section of the second lane before merging is not determined to be downhill, increasing a speed of the vehicle before merging so that a target speed or target acceleration of the vehicle during merging is set to a first speed or acceleration, and
wherein, in response to determining, based on the surrounding situation, that the vehicle is traveling in the first lane and merges into the second lane from the first lane, and a section of the second lane before merging is determined to be downhill, increasing a speed of the vehicle before merging so that the target speed or target acceleration of the vehicle during merging is set to a second speed or acceleration higher than the first speed or acceleration.

11. A non-transitory storage medium having a program stored therein, the program causing a computer to:
recognize a surrounding situation of a vehicle; and
control one or both of steering and acceleration or deceleration of the vehicle on a basis of the surrounding situation,
wherein, in response to determining, based on the surrounding situation, that the vehicle is traveling in a first lane and merges into a second lane from the first lane, and a section of the second lane before merging is determined to be downhill, increasing a speed or acceleration of the vehicle during merging with respect to a case where the section before merging is not determined to be downhill, wherein the first lane ultimately terminates at a defined future distance.

12. The non-transitory storage medium according to claim 11,
wherein, in response to determining, based on the surrounding situation, that the vehicle is traveling in the first lane and merges into the second lane from the first lane, and a section of the second lane before merging is not determined to be downhill, increasing a speed of the vehicle before merging so that a target speed or target acceleration of the vehicle during merging is set to a first speed or acceleration, and
wherein, in response to determining, based on the surrounding situation, that the vehicle is traveling in the first lane and merges into the second lane from the first lane, and a section of the second lane before merging is determined to be downhill, increasing a speed of the vehicle before merging so that the target speed or target acceleration of the vehicle during merging is set to a second speed or acceleration higher than the first speed or acceleration.

* * * * *